United States Patent [19]

Watanabe et al.

[11] 4,158,210
[45] Jun. 12, 1979

[54] PICTURE IMAGE DISPLAY DEVICE

[75] Inventors: Masanori Watanabe, Katano; Kinzo Nonomura, Hirakata; Masakazu Fukai, Nishinomiya, all of Japan

[73] Assignee: Matsushita Electric Industrial Co., Ltd., Osaka, Japan

[21] Appl. No.: 832,919

[22] Filed: Sep. 13, 1977

[51] Int. Cl.² .............. H04N 9/12; H04N 5/66; H01J 31/10; H01J 31/20
[52] U.S. Cl. .................... 358/56; 358/230; 358/242; 315/366; 313/422
[58] Field of Search ............ 358/56, 59, 64, 65, 358/66, 230, 241, 242; 315/13 R, 366, 169 R, 169 TV; 313/409, 411, 413, 414, 422, 491, 492, 495–497

[56] References Cited

U.S. PATENT DOCUMENTS

| | | | |
|---|---|---|---|
| 2,876,374 | 3/1959 | Riggen | 313/495 |
| 3,176,184 | 3/1965 | Hopkins | 358/230 |
| 3,531,681 | 9/1970 | Harden | 313/422 |
| 3,624,273 | 11/1971 | Gale | 358/56 |
| 3,678,330 | 7/1972 | Landrum | 315/13 R |
| 3,935,500 | 1/1976 | Oess et al. | 313/495 |

Primary Examiner—John C. Martin
Attorney, Agent, or Firm—Wenderoth, Lind & Ponack

[57] ABSTRACT

The present invention relates to a picture image display device constituted a control electrode for taking out an electron beam from a flat electron source and a display plate for emitting light in accordance with the impinging of the electron beam. The picture image display device has a control for deflecting the electron beam before it reaches the display plate, a plural number of slits are provided in an insulating substrate, on the wall surfaces of which slits are electron beam controlling electrodes.

6 Claims, 11 Drawing Figures

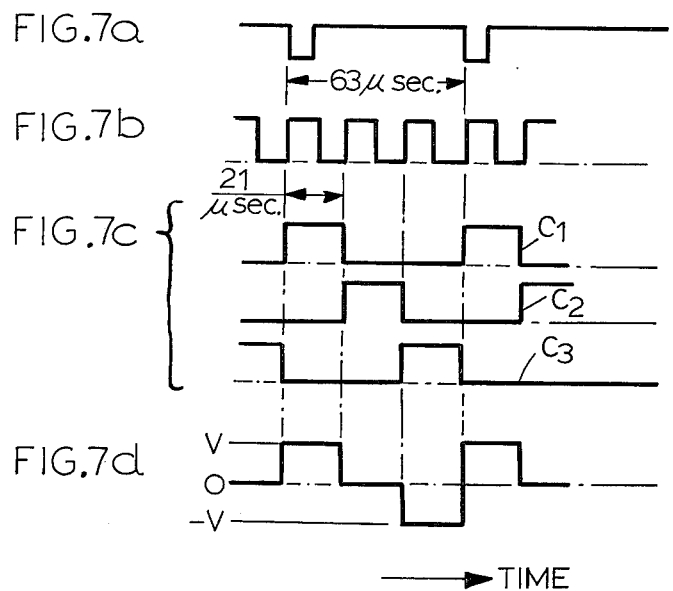
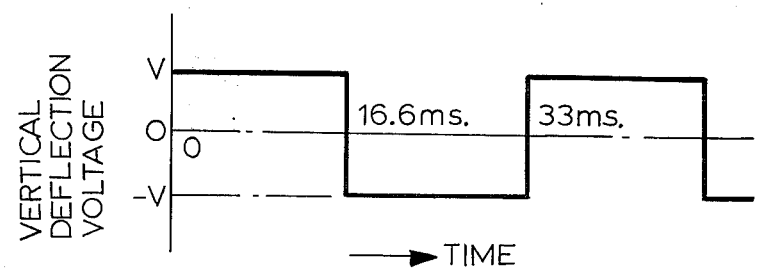
FIG.8

PICTURE IMAGE DISPLAY DEVICE

BACKGROUND OF THE INVENTION

The present invention relates to an image display device in which the electron beam delivered from a substantially flat electron source is controlled and accelerated by electron beam control electrodes before being projected on the phosphor surface of the image display device, thereby forming the picture image display.

Heretofore, there has been developed matrix type flat plate shaped display devices in which EL, plasma, liquid crystals, etc., are used. In these devices, satisfactory performances are still not obtained with respect to the brightness, emission efficiency, color indication, etc., and such picture image display devices are still short of the quality needed for practical applications, e.g. for television.

On the other hand, an attempt at composing flat plate shaped display devices based on the use of an electron beam has been reported.

FIG. 1 shows the construction of the essential part of an example of display devices of this sort which have been known heretofore. Referring to this sketch, a flat plate shape electron source is provided which can be thermoionic cathodes, electric field discharge cold cathodes, etc., for example. A lattice shape electrode plate 2 having a large number of holes 6 therethrough is provided, on which voltage which is positive with respect to the flat plate shape electron source 1 is impressed to produce an electron beam. Part of the electron beam passes through the holes 6, and reaches the surface of a first electron beam control electrode plate 3. In the first electron beam control electrode plate 3 and a second electron beam control electrode plate 4, large number of holes 6a and 6b are provided and are regularly arranged longitudinally and laterally in rows and columns, and long strip shaped electrodes 7 and 8 are installed in an arrangement in which they criss-cross each other and with appropriate distance between them, and the holes 6a and 6b provided in the two electrodes at these intersections are in line with each other. The electron beam, as it reaches the surface of the first electron beam control electrode plate 3, has the current modulated corresponding to the signal voltage impressed on each electrode 7, while passing through the hole 6a, and then reaches the surface of the second electron beam control electrode plate 4.

At the second electron beam control electrode plate 4, the electron beam is modulated similar to that carried out at the first electron beam control electrode plate 3, as it passes through the hole 6b.

The electron beam which passed through the hole 6b is accelerated by an accelerating electrode plate 5 on which a high voltage is impressed, and impinges upon a phosphor film 9 coated on the surface of this accelerating electrode plate 5, causing it to emit light. Since the brightness of emission is proportional to the electron beam current on each picture element, a picture image corresponding to the signal voltage impressed on each of the electrodes installed on the two electron beam control electrode plates 3 and 4 can be produced. For the substrate 5 on which the accelerating electrode is mounted, a transparent insulating substrate, for example, glass, is employed, and on its surface, a transparent electrode is mounted, or a metal backing system like that of an ordinary cathode ray tube can be applied.

Generally, in display devices of this type, so-called matrix type display devices, the resolution of the picture image is determined by the size and pitch of the holes provided in the electron beam control electrodes or their substrates. Accordingly, the higher the resolution of the picture image, and thus the clearer the picture image it is desired to achieve, the smaller the diameter of the holes and the pitch. Accordingly, in order to obtain a clear picture image on a display screen of a particular size, the holes 6a and 6b and the group of electrodes 7 and 8 need to be closely arranged, and accordingly, the number of holes and the number of electrodes must be greatly increased. For example, for the purpose of displaying a TV picture image, a minimum of $500 \times 500$ holes are required, and for each electron beam control electrode plate, 500 electrodes are needed. If a color display is desired, three times this number of holes and electrodes are necessary.

The number of such electrodes that can be accommodated in view of the materials and the manufacturing techniques available at the present present time is limited to 2–3 per 1 mm of space, thus making it difficult to obtain the proper resolution. Moreover, as the numbers of holes and electrodes are increased, the driving circuits and the junctions between the driving circuits and respective electrodes greatly increase in number, posing a grave problem of actual installation, or giving rise to failures in the device. Such difficult problems are many.

OBJECTS OF THE INVENTION

It is the first object of this invention, for solving the problems described above, to provide a picture image display device whereby a picture image can be obtained on the picture image display screen which has a high resolution and clarity.

The second object of this invention is to provide a picture image display device in which the number of holes in the control electrodes and the number of electrodes can be greatly reduced as compared with prior art devices while maintaining the high resolution.

The aforementioned objects of this invention can be achieved by a picture image display device according to the invention in which deflection electrodes for deflecting the controlled electron beam are provided on an electron beam control electrode plate to deflect the electron beam either vertically or horizontally, or both, thereby forming the picture image on the phosphor coated picture image display panel.

Other objects, features and advantages of this invention are described in the following specification.

BRIEF DESCRIPTION OF THE DRAWINGS

FIGS. 7c-7d are diagrams showing the wave forms of the signals in FIG. 6; and

FIG. 8 is a diagram showing the wave form of a vertical deflection voltage.

DETAILED DESCRIPTION OF THE INVENTION

Figure 2:
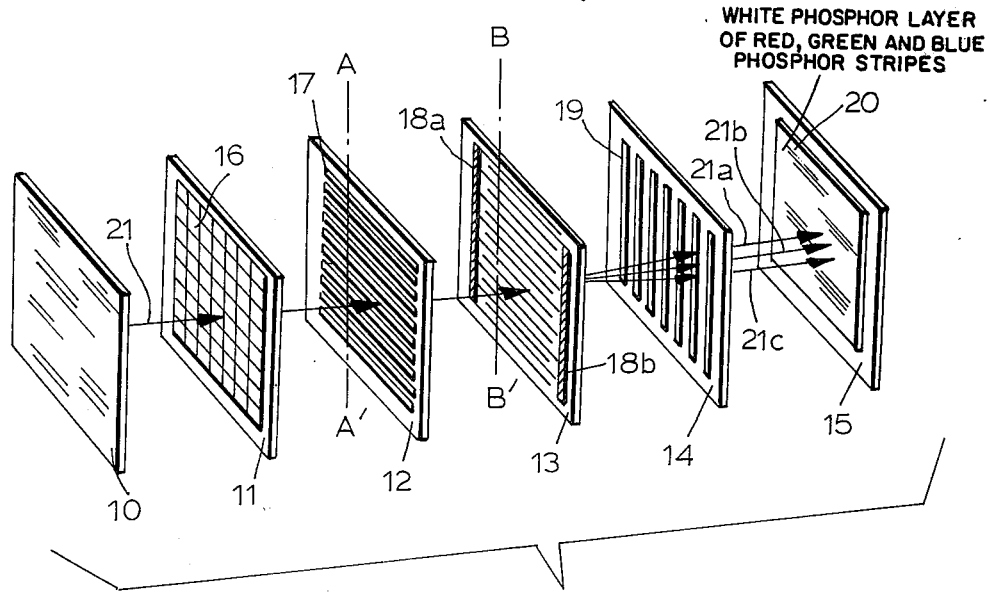
FIG. 2 is an exploded perspective view of the picture image display device according to the present invention.

FIG. 2 shows an embodiment of the picture image display device of this invention.

The first element of the device is a planar electron source 10. It can be a flat plate thermionic cathode or electric field discharge type cold cathode, but for good to economy and reliability, a pseudo plane cathode should be used which is formed by a plurality of substantially parallel tungsten wires at appropriate intervals and coated with an oxide electron emitting material. An anode substrate 11 is positioned adjacent the planar electron source 10 on a specified part of which is positioned a mesh constituting an electrode 16. On the mesh electrode 16 is impressed a voltage which is positive relative to the cathode so that an electron beam of nearly uniform current density is smitted from the plane electron source 10. In order to increase the transmission of the electron beam, the mesh electrode 16 should have a maximum effective area. In the mesh electrode 16, holes are provided at positions in line with the holes in a first electron beam control electrode plate 12.

The mesh electrode 16 may be composed of a sheet of mesh material, but in order to obtain the necessary electron beam density, an accelerating positive voltage of several tens of volts, relative to the cathode, must be impressed on electrode 11. When a voltage of several tens of volts is impressed over the whole mesh electrode, not only is several tens of watts of power consumed, but the continuous flow of current heats the mesh to a red heat. As a means for overcoming such difficulties, the mesh electrode is divided into a plurality of long strip shape mesh electrodes, and the voltage is applied successively to them.

Figure 3:
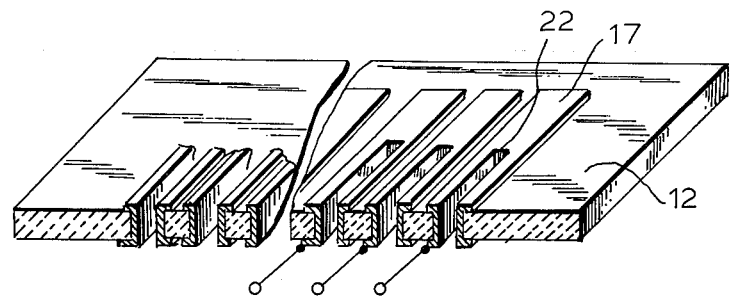
FIG. 3 is a perspective view, partly in section, of the electron beam control electrode plate of FIG. 2.

A perspective view of a section of the first electron beam control electrode plate 12 or the second electron beam control electrode plate 14 is shown in FIG. 3. Slot-shaped holes 22 are provided at specified intervals in the insulating material substrate, and on the inside wall surfaces of the holes are mounted electrodes 17, each electrode being connected to a corresponding control circuit. Each electrode is insulated from the others. The electrode can be formed by vacuum evaporation, sputtering, non-electric field plating or the like. As the insulating material substrate, ordinary plate glass, ceramic plate, semiconductor substrate, or the like, can be employed, and the holes can be provided by a photo-etching technique, or the like. When the slots are formed by a photo-etching technique, however, the variation in the slot width can become large. This causes bright spots or color shifts, especially when the device is used as a TV picture image display device which requires intermediate tone displays. To overcome this difficulty, a photosensitive crystallized glass is used. The photosensitive crystallized glass is known by the trade name of "Photoceram". When it is heat-treated after exposure to irradiation by ultraviolet rays, the part irradiated by the ultraviolet rays is crystallized, so that the slots can be formed by utilizing the difference in the etching rate between the crystallized part and the uncrystallized part. In that way, accurate holes can be formed, regardless of the thickness of the substrate. Furthermore, this method is especially effective in forming the holes in a stepped configuration to ensure proper mechanical strength and in manufacturing an electron beam deflecting electrode 13. The reason is because since high accuracy hole formation is possible, the parallelism between the pair of deflecting electrodes is high, making it possible to produce a uniform deflection angle of the electron beam. This is very difficult to achieve, if the glass plate is photo-etched in the usual manner. When a silicon semiconductor substrate is used as the insulating substrate, the substrate surface is oxidized by thermal oxidation, for example and then, the electrode is formed on the insulating film of silicon oxide.

Each electrode on the aforementioned electron beam control electrode plates 12 and 14 is connected to a driving circuit for controlling the electron beam. This driving circuit and other necessary circuits described later can be provided in an integrated form on a part of the insulating substrate of the control electrode which can be a semiconductor substrate. The individual electrodes on the pair of electron beam control electrode plates are arranged to be substantially perpendicular to each other.

Figure 4:
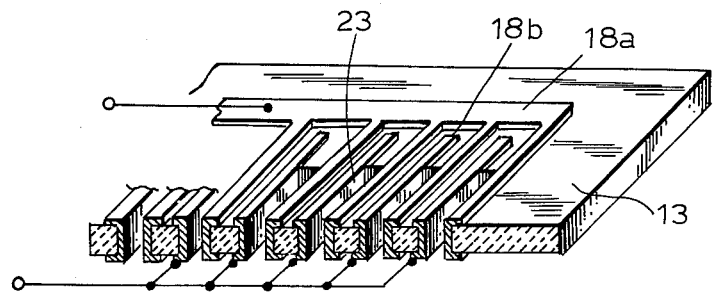
FIG. 4 is a perspective view, partly in section, of the electron beam deflecting electrod plate of FIG. 2.

Between the two electrode plates 12 and 14, is an electron beam deflecting electrode plate 13. A perspective view of a section of the electron beam deflecting electrode plate 13 is shown in FIG. 4. In insulating substrate, slot-shaped holes 23 are provided at specified intervals. The intervals between the holes are in an arrangement which is coordinated with the slots in the electron beam control electrode plate 12. On the inside wall surfaces of the holes 23 are provided electrodes 18a and 18b for deflecting electron beam by an electric field produced therebetween. The electrodes 18a and 18b are connected alternately in a comb configuration, forming mutual pair of deflecting electrodes.

In the foregoing embodiment, as described, the electrodes are formed on the holes provided in the insulating substrate. However, they may be formed by metal wires or metal strips.

A picture image display board 15 is provided in which the conductivity is provided by the so-called metal back system in which a phosphor film 20 is coated on a transparent substrate, e.g., a glass substrate and on its surface, a conductor film such as aluminum is vapor-deposited, or a transparent conductive film is adhered to a glass substrate and a phosphor film is coated on its surface.

The phosphor film can be made into a color display panel by providing successive stripes of phosphors which emit red, green and blue light.

In operation, electrons discharged from the planar electron source 10 are accelerated by the electrode 16 acting as an anode, and the electron beam coming past the mesh electrode enters substantially perpendicularly into the first electron beam control electrode plate 12. On each electrode 17 on the first electron beam control electrode plate 12, a voltage which is more negative than the potential of the planar electron source, the cathode, is impressed. Accordingly, the in-coming electron beam flows into the electrode 16, but is unable to pass through the holes 22 of the control electrode plate. The device is then in a so-called cut-off state.

Now, if zero potential or a positive potential is applied to the m-th electrode, one of the electrodes 17, the electrons can pass through only the hole at the m-th electrode, producing a strip shaped electron beam with a width the same of that of the hole. This strip shaped electron beam enters the m-th pair of electrodes, of the electrode pairs on the electron beam deflecting electrode plate 13, which are at a slot in a position corresponding to the aforementioned m-th electrode. According to whether the potential between the pair of electrodes 18a and 18b is zero, or positive or negative (assuming either 18a or 18b to be positive), the electron beam comes out as beam 21a or 21b or 21c. If there is no control electrode plate a luminous line appears on the display board panel 15 at one of three positions. To be sure, the deflection angle of the electron beam changes for various potential differences between the pairs of deflection electrodes; for this reason, as seen from FIG. 2, a plurality of luminous lines may be produced at different levels on the display panel 15, and by continuously altering the potential difference, continuously shifting luminous lines can be obtained on the display panel.

The foregoing description, is for the situation in which the second electron beam control electrode plate 14 is absent, or the control electrode plate 14 permits the passage of the entire electron beam from the electrode plate 13. In practice a signal voltage is applied to the electrode plate 14. This control electrode plate 14 has a similar function to that of the first electron beam control electrode plate 12. Thus, when a more negative potential than that of the planar electron source 10 is impressed on an electrode 19 on the second electron beam control electrode plate 14, the electron beam coming past the electron beam deflecting electrode plate 13 can not pass through the holes at each electrode on this control electrode plate 14. However, if a zero or a positive potential is applied to the n-th electrode of the control electrode plate 14, the electron beam passes through the control electrode plate and reaches the surface of the display panel 15, through the n-th electrode of the electrodes on the control electrode plate 14, appearing as a bright spot. Similarly, if a zero or a positive potential is applied to a plurality of electrodes 17, a plurality of brilliant spots are obtained on the display panel 15. Since slot-shaped holes substantially perpendicular to the holes provided in the control electrode plate 12 and the deflecting electrode plate 13 are provided in the control electrode plate 14, any one of the electron beams 21a, 21b and 21c deflected by the deflecting electrode plate 13 will reach the display panel through the holes. This is the reason why the holes are not formed in the usual circular shape, but in an oblong or slot-shape.

Based on a similar principle, a similar effect can be achieved by disposing an another deflecting electrode plate between the second electron beam control electrode plate 14 and the display panel 15. Or by using both intermediary deflecting electrode plates, the electron beam can be two dimensionally deflected, that is, vertically can be well as horizontally, as quite easily understood from this principle.

Figure 1:
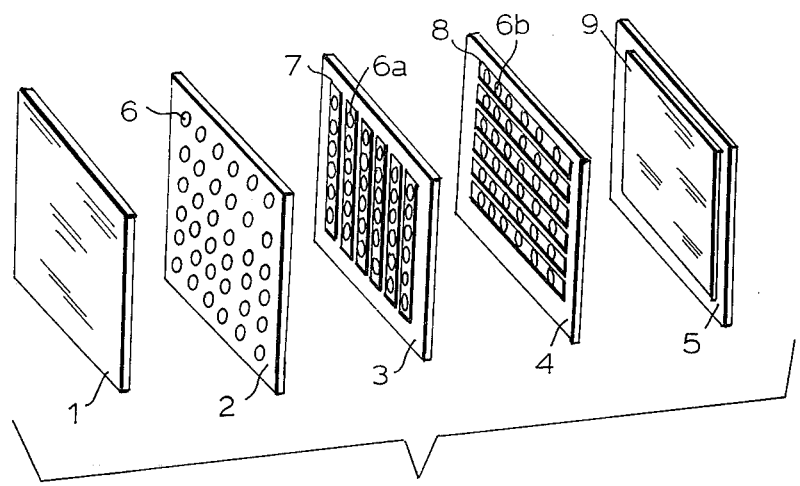
FIG. 1 is an exploded perspective view of the parts of a conventional device.
Figure 5:
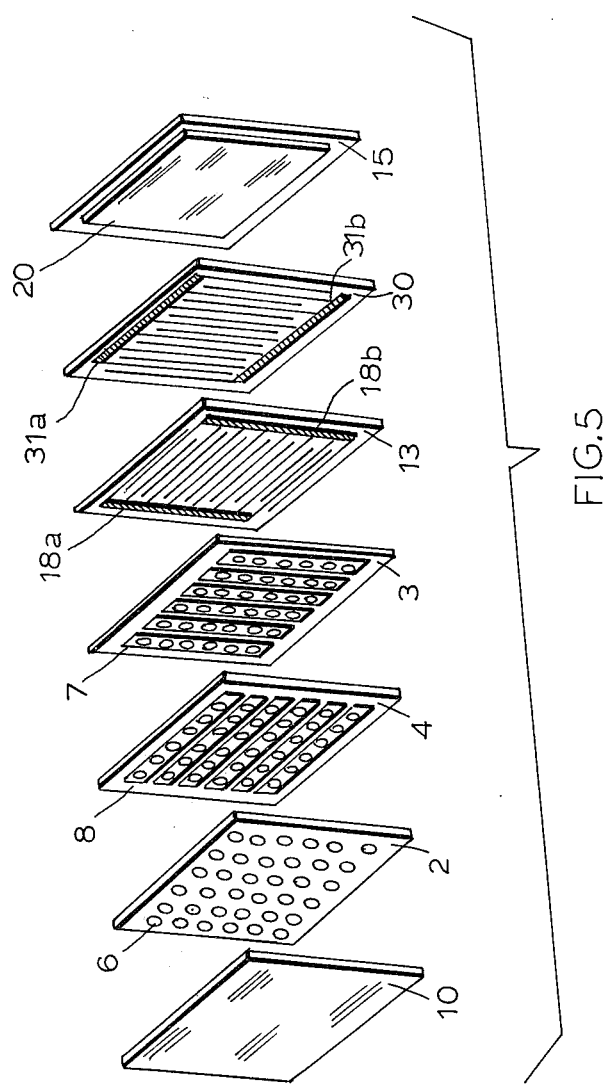
FIG. 5 is an exploded perspective view of another embodiment of the picture image display device, according to this invention.

FIG. 5 shows an another embodiment of this invention, which includes such another deflecting electrode plate, wherein the same numerals designate like parts to those of FIGS. 1 and 2. In the display device of FIG. 5, the first and second control electrode plates 3 and 4, the same as those of FIG. 1, are arranged between the lattice shaped electrode plate 2 and a first deflecting electrode plate 13 which deflects the electron beams vertically. There is provided a second deflecting electrode 30 which deflects the electron beams horizontally in accordance with a deflection voltage supplied between electrodes 31a and 31b the same as electrodes 18a and 18b. According to this embodiment, the electron beam from the control electrode 3 is deflected not only in the vertical direction but in the horizontal direction as well.

The picture image display devices of this invention will give the greatest effect when used as a TV picture image display device. In the following, the use of the device as a TV picture image display device is illustrated.

Figure 6:
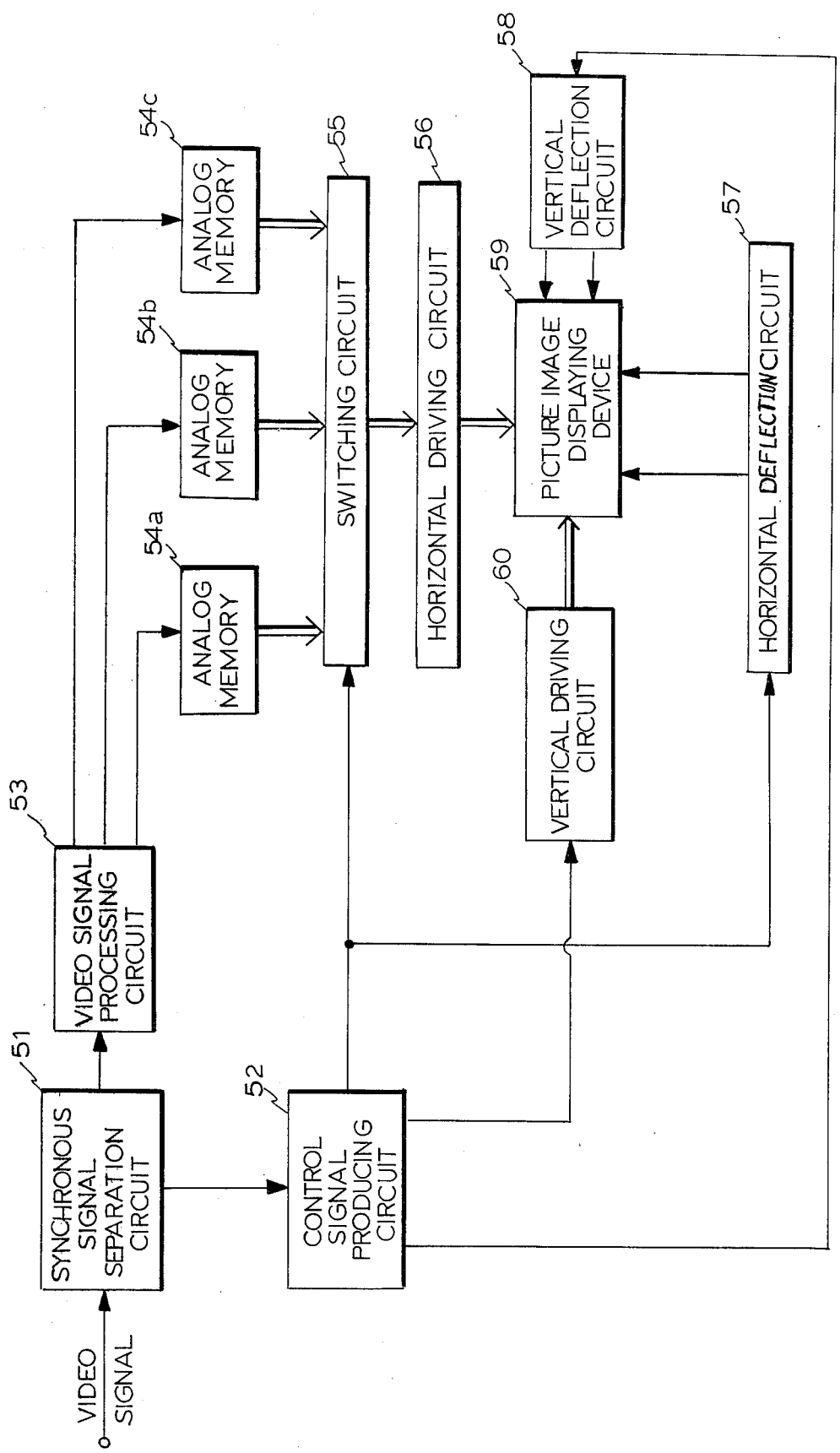
FIG. 6 is a block circuit diagram showing the sequence of signal voltages for a picture image display device of the present invention used as a TV picture image display.

An arrangement of a driving system for the TV picture image display of this embodiment is shown in FIG. 6. This display device has a construction as shown in FIG. 5 with 250 vertical electron beam control electrodes and 250 horizontal electron beam control electrodes. In this system, a single scanning line simultaneous display system which is commonly used in matrix type display devices is employed. Furthermore, first and second deflecting electrodes 13 and 30 are provided which are coordinated with the first and second electron beam control electrodes 4 and 3. Both deflecting electrodes 13 and 30 have a construction as shown in FIG. 4 and function to deflect the electron beam vertically and horizontally by means of a deflecting voltage applied across the pairs of electrodes 18a and 18b and 31a and 31b.

Referring to FIG. 6, a composite video signal is supplied to a synchronous signal separation circuit 51, and is separated into the video signal and the synchronous signal, which are respectively supplied to a control signal producing circuit 52 and a video signal processing circuit 53. In the video signal processing circuit 53, by means of sampling pulses which are synchronous signals produced by the control signal producing circuit 52, the video signal for one horizontal scanning line is broken down into a series of 750 signals, which are held, and at the end of one horizontal period, the 1st, 4th, 7th, ..., 748th signals are stored in an analog memory 54a, the 2nd, 5th, 8th, ..., 749th signals in an analog memory 54b, and the 3rd, 6th, 9th, ..., 750th signals in an analog memory 54c, respectively; thus, this signal is converted into parallel signals. The analog memories 54a, 54b and 54c can be condenser memories or a charge transfer device such as a CCD, BBD, etc., ..., with 250 output terminals linked to a switching circuit 55.

In the control signal producing circuit 52, there is produced from the horizontal synchronous signal having a period of 63 $\mu$ sec, as shown in FIG. 7a, a pulse signal having a period of ⅓ that of the horizontal synchronous signal period (21 $\mu$ sec) phase-locked to this horizontal synchronous signal, as shown in FIG. 7b, and furthermore, as shown in FIG. 7c, horizontal control signals $C_1$, $C_2$ and $C_3$, are produced, having a pulse width of 21 $\mu$ sec, appearing at different positions trisecting one horizontal period. Of the picture image signals stored in the respective memories, the output from the memory 54a is switched by the switching circuit 55 during the horizontal control signal $C_1$, the output from 54b during $C_2$, and the output from 54c during $C_3$, respectively, and they are supplied to a horizontal driving circuit 56, where these signals are amplified, and are then fed in parallel to the 250 horizontal electron beam control electrodes.

On the other hand, the horizontal control signals C sent from the control signal producing circuit 52 are supplied a horizontal deflection circuit 57, where deflecting voltages at three levels V, O and −V, as in FIG. 7d, are produced by the respective signals $C_1$, $C_2$ and $C_3$. Such deflecting voltages are produced by selecting one of three voltage sources (including zero volts) by means of the horizontal control signals. This deflecting voltage d is simultaneously applied across each pair of electrodes of the 250 pairs on the second deflecting electrode plate 30. As a result, for example, in the initial 21 μ sec, the electron beam from each pair of electrodes is deflected left-ward, as seen from the front of the display panel; in the second 21 μ sec period, the beam is not deflected; and in the third 21μ sec period, it is deflected right-ward. The timing of this deflection is synchronized with the switching operation of the switching circuit 55. Thus, in the first 21 μ sec, the signals from the memory 54a are impressed on the control electrodes 3, and in other periods, the corresponding signals from memories 54b and 54c are respectively impressed on the same control electrodes, and according to the signal levels of the deflecting voltages, the angle of the beams passing the electrodes 3 is modulated, so that the picture image is reproduced on the display panel by the successive display of the three sets of signals from the memories.

For vertical scanning, a vertical driving circuit 60 is provided which is composed of a shift register from which a vertical scanning pulse for effecting the selection of successive lines in the vertical direction for each horizontal period is produced by the horizontal synchronized signal produced by the control signal producing circuit 52 or a signal synchronized therewith. The vertical scanning pulse is applied to one of the electrodes 8 on the first control electrode plate 4 such as shown in FIG. 5 to permit the beam coming to the hole to pass therethrough during one horizontal scanning period.

On the other hand, there are applied to the first deflecting electrode 13 in FIG. 5, a deflection voltage at a positive level of V in a initial period of about 16.6 m sec and a voltage at a negative level of −V in the next 16.6 m sec period, such as shown in FIG. 8, thereby providing a 2:1 interlacing. The deflection voltages are produced by selecting different voltage sources from a vertical deflection circuit 58 by means of the two value signals synchronized with the vertical synchronous signals produced by the control signal producing circuit 52 at different levels in the first field and in the second field. By this vertical deflection, for example, the electron beam is deflected upwardly in the first field, and it is deflected downwardly in the second field.

The above description clearly shows that by using 250×250 electron beam control electrodes and 2 deflecting electrode plates, 500×750 picture elements can be obtained. That is to say, as compared with the ordinary X-Y matrix display device which is not provided with two deflecting electrode plates, twice as high a resolution is achieved in the vertical direction, and three time as high a resolution is obtained in the horizontal direction. Furthermore, a reduction in the number of electrodes to 1/6 thereof while achieving an identical resolution results in great ease in the manufacture of electrode plates, simplified driving circuits, and a corresponding reduction in cost, as well as easy installation and less frequent incidence of failure.

In the image display device of FIG. 6, in order to obtain a high resolution in a black and white display, the picture image signal for one horizontal scanning line is trisected in time, and each signal corresponding to ⅓ of the horizontal scanning line is successively applied to the second control electrode. This approach is also applicable to a color picture image display. In the latter instance, referring to FIG. 6, the color signals for red, blue and green are demodulated and stored in the three analogue memories 54a, 54b and 54c, and red, blue and green phosphors are respectively coated on the fluorescent surface which receives the beams deflected by the second deflecting electrode during each horizontal period.

In the foregoing example, where the vertical scanning and the vertical deflection are concerned, in order to enable interlacing, the deflection in the vertical direction is made in two steps, upward and downward, but deflections in more than three steps can be made easily as required.

According to one of such methods, signal voltages are applied on the first electron beam control electrodes which effects the line selection in a plurality of horizontal scanning periods, e.g., four horizontal scanning periods, and deflecting voltages are applied on the vertical deflection electrodes at multiple levels, e.g., 4 levels, in synchronism with the vertical scanning signals. By carrying out the operations successively with the vertical electron beam control electrodes and the deflecting electrodes, the scanning for one frame is performed. This scanning procedure is effective especially where the display device has a small screen surface, and hence, requires high resolution.

According to another method, sawtooth wave from voltages other than stepped deflection voltages, are impressed on a set of vertical electron beam control electrodes in a plurality of horizontal scanning periods, e.g., 4 horizontal scanning periods. Subsequently, the successive vertical electron beam control electrodes are subjected to similar operations. By this scanning method, the overall surface of the screen is covered, so that the display of the picture image can be accomplished by a smaller number of scanning lines than is usual for the size of the screen; for example, with a large display panel, a smooth screen display without distinct individual scanning lines is effectively obtained.

The foregoing description shows that the display device of this invention makes possible the achieving of high density and high resolution on the screen a, large cutback in the number of electrodes used as compared with conventional devices, and accordingly, a simplified driving circuit, low cost, ease of installation, or less frequent incidence of failure because of a reduced number of connecting terminals. Thus, it has very outstanding effects.

What we claim is:

1. A picture image display system comprising: a picture image display device having, in the recited order, a substantially planar electron source, electrode means for taking out electrons from said electron source, electron beam control means for selectively controlling the passage of the electrons from said electrode means to form a plurality of lines of electron beams, deflecting means for deflecting the electron beams received from said electron beam control means, and display means for receiving the electron beams from said deflecting means and emitting light when struck by said electron beams; deflecting driving means connected to said deflecting means for applying to said deflecting means a stepped deflecting voltage at one of m levels, m being an integer $\geq 2$, means for converting picture image signals for a single horizontal period into m×n picture image signals for a single horizontal period into m×n picture image signal groups, n being an integer $\geq 1$, m memory means connected to said converting means for storing the respective sets of signals from among said signal groups which are represented by the expressions (ml−m+1), (ml−m+2) and ml, l being the integers 1,2 ... n, and display driving means connected between said memory means and said electron beam control means for controlling said electron beam control means for passing to said display means the signals coming from the respective memory means in succession for each line, one group being displayed for each level of said deflection voltages.

2. A picture image display device as claimed in claim 1 wherein m=3, and said picture image signals are divided into red, green and blue color signals, and there are three memory means for storing the respective color signals.

3. A picture image display system comprising: a picture image display means having, in the recited order, a substantially planar electron source, electrode means for taking out electrons from said electron source, electron beam control means for selectively controlling the passage of the electron beams from said electrode means to form a plurality of horizontal lines of electron beams, first deflection electrodes for deflecting the electron beams in the horizontal direction, second deflecting electrodes for deflecting the electron beams in the vertical direction, and display means coated with a pattern of red, green and blue light emitting phosphors corresponding to the pattern of electron beams and which respectively emit light when struck by electron beams; driving means connected to said first deflection electrodes for applying to said first deflection electrodes first stepped deflection voltages during a horizontal scanning period when a horizontal line of electron beams is being passed by said electron beam control means and for switching said first voltages among three levels for deflecting the electron beams onto the respective red, green and blue light emitting phosphors at the respective voltage levels, and connected to said second deflection electrodes for applying to said second deflection electrodes second stepped deflection voltages and for switching among the levels during vertical scanning of the successive horizontal lines of electron beams; three memory means for storing picture image signals separated into groups of red, green and blue signals for successive horizontal lines of an image display, means for taking output signals from said memory means in synchronism with the steps of said first deflection voltages and connected to said electron beam control means for controlling production of the electron beams in accordance with said output signals, whereby a colored image is displayed on said image display means.

4. A picture image display system, comprising: a picture image display device having, in the recited order, a substantially planar electron source, electrode means for taking out electrons from said electron source, an electron beam control means having lines of electrodes and rows of electrodes arranged in a matrix for selectively controlling the passage of electron beams from said electrode means; deflecting means for deflecting the electron beams received from said electron beam control means and having groups of line deflection electrodes the line deflection electrodes of which are aligned with said lines of electrodes of said electron beam control means and groups of row deflection electrodes the row deflection electrodes of which are aligned with said rows of electrodes of said electron beam control means; display means for receiving the electron beams from said deflecting means and emitting light when struck by said electron beams; first driving means connected to said groups of line deflection electrodes for applying simultaneously to each of said line deflection electrode groups a stepped vertical deflection voltage at one of k levels, k being an integer $\geq 2$; second driving means connected to said groups of line deflection electrodes for dividing into m levels, m being an integer $\geq 2$, each of the vertical scanning periods of said vertical deflection voltages and applying simultaneously to each of said row deflection electrode groups a stepped horizontal deflection voltage at one of m levels; converting means for converting picture image signals for a single horizontal period into $m \times n$ picture image signal groups, n being an integer $\geq 1$; m memory means connected to said converting means for storing respectively the (ml−m+1)-th, the (ml−m+2)-th, and the m-th signals of the m signal groups thus converted, l being the integers 1, 2, ... n, and switching means connected between said memory means and said electron beam control means for applying successively to said electron beam control means the n output signals taken from each of said m memory means in correspondence with the steps of said horizontal deflection voltages.

5. A picture image display system as claim in claim 4 wherein m=3 and said converting means is converting means for dividing said picture image signals into red, green and blue color signals and converting the divided picture image signals into $3n$ picture image groups, and wherein said display means is coated with red, green and blue phosphors in positions corresponding to the positions at which the electron beams deflected by the three stepped horizontal deflection voltages strike said display means.

6. A picture image display system as claimed in claim 4 wherein k=2 and said first driving means comprises means for alternately applying a vertical deflection voltage of a first level for a first field scanning period and a vertical deflection voltage of a second level for a second field scanning period, whereby an image display formed by interlaced scanning is provided.

* * * * *